United States Patent
Suvanprakorn et al.

(10) Patent No.: US 6,410,060 B1
(45) Date of Patent: Jun. 25, 2002

(54) METHOD FOR THE IODINE FORTIFICATION OF EGGS

(75) Inventors: Pichit Suvanprakorn; Lerson Tanasugarn; Anusig Limahksohn; Sangsom Sinawat; Prakrom Vuthipongse, all of Bangkok (TH)

(73) Assignee: Biophile Corporation, Bangkok (TH)

( * ) Notice: Subject to any disclaimer, the term of this patent is extended or adjusted under 35 U.S.C. 154(b) by 0 days.

(21) Appl. No.: 09/081,494

(22) Filed: May 19, 1998

(51) Int. Cl.$^7$ .................. A61K 33/18; A61K 47/00; A61K 35/54; A23L 1/32; A23B 5/18
(52) U.S. Cl. .................. 424/668; 424/439; 424/581; 424/667; 424/669; 424/670; 424/671; 426/74; 426/298; 422/22; 422/23; 422/37
(58) Field of Search .................. 424/663, 667–672, 424/581, 439; 426/74, 298, 614, 806; 422/22, 23, 37

(56) References Cited

U.S. PATENT DOCUMENTS 2,915,400 A * 12/1959 Seltzer .................. 426/72
4,187,294 A * 2/1980 Ishikawa et al. .......... 424/669
5,246,717 A * 9/1993 Garwin .................. 426/2

FOREIGN PATENT DOCUMENTS

| CN | 1076596 | * | 9/1993 |
| EP | 472003 | * | 2/1992 |
| JP | 2-257859 | * | 10/1990 |

OTHER PUBLICATIONS

Chemical Abstracts 120 ; 243069, abstracting CN 1,076, 596, 1993.*
File JPAB on WEST, accession No. JP402257859A, abstracting JP 2–257859, 1990.*
Chemical Abstracts 78 : 39125 (1973).*
CAB Abstract 79 : 104479 (1976).*

* cited by examiner

Primary Examiner—John Pak
(74) Attorney, Agent, or Firm—Townsend and Townsend and Crew LLP

(57) ABSTRACT

This invention relates to the method of non-invasively fortifying eggs with iodine as a dietary supplement without compromising the structural integrity of the egg. The eggs are placed in a solution comprising iodide or iodate salts of alkali or alkali earth metals at an effective concentration for a duration of between a few seconds to a few days. Iodine then passes through the egg shell to the interior of the egg until an adequate internal iodine concentration of iodide or iodate salts is produced.

9 Claims, 2 Drawing Sheets

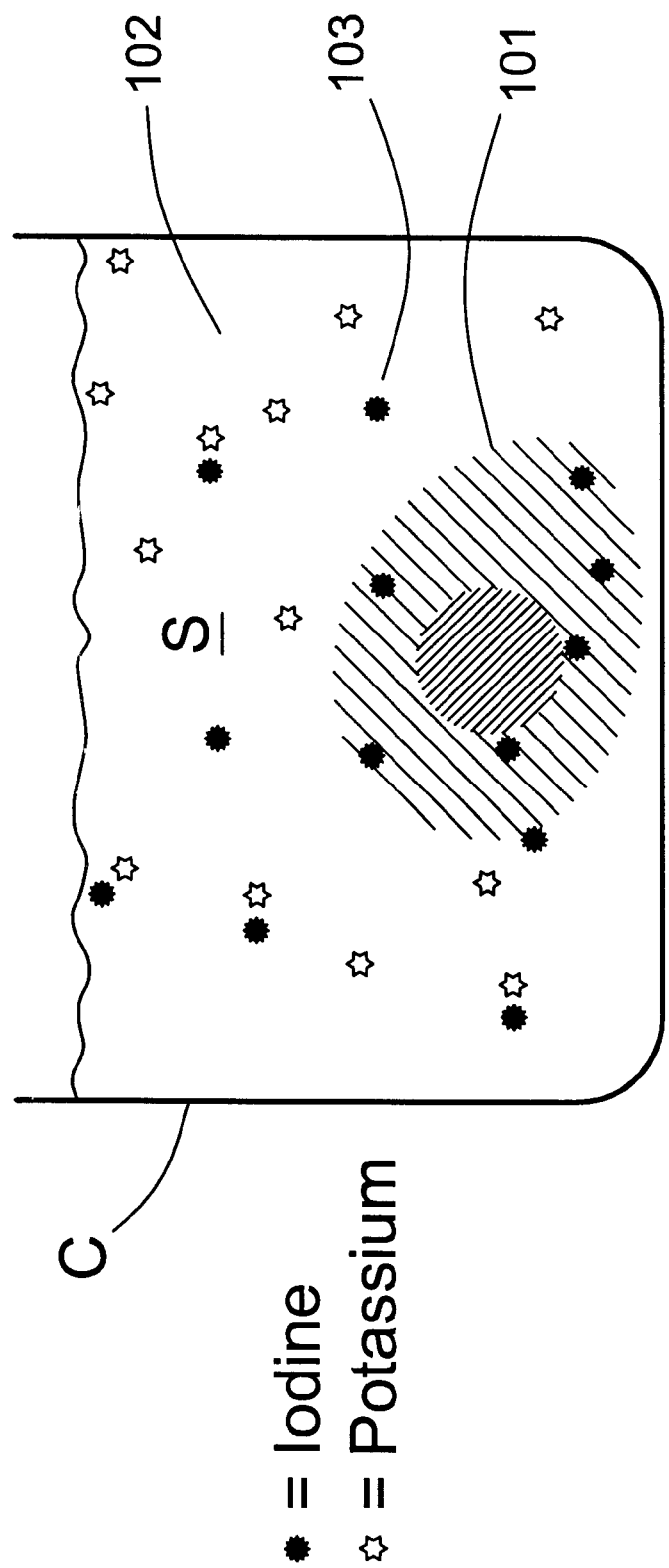

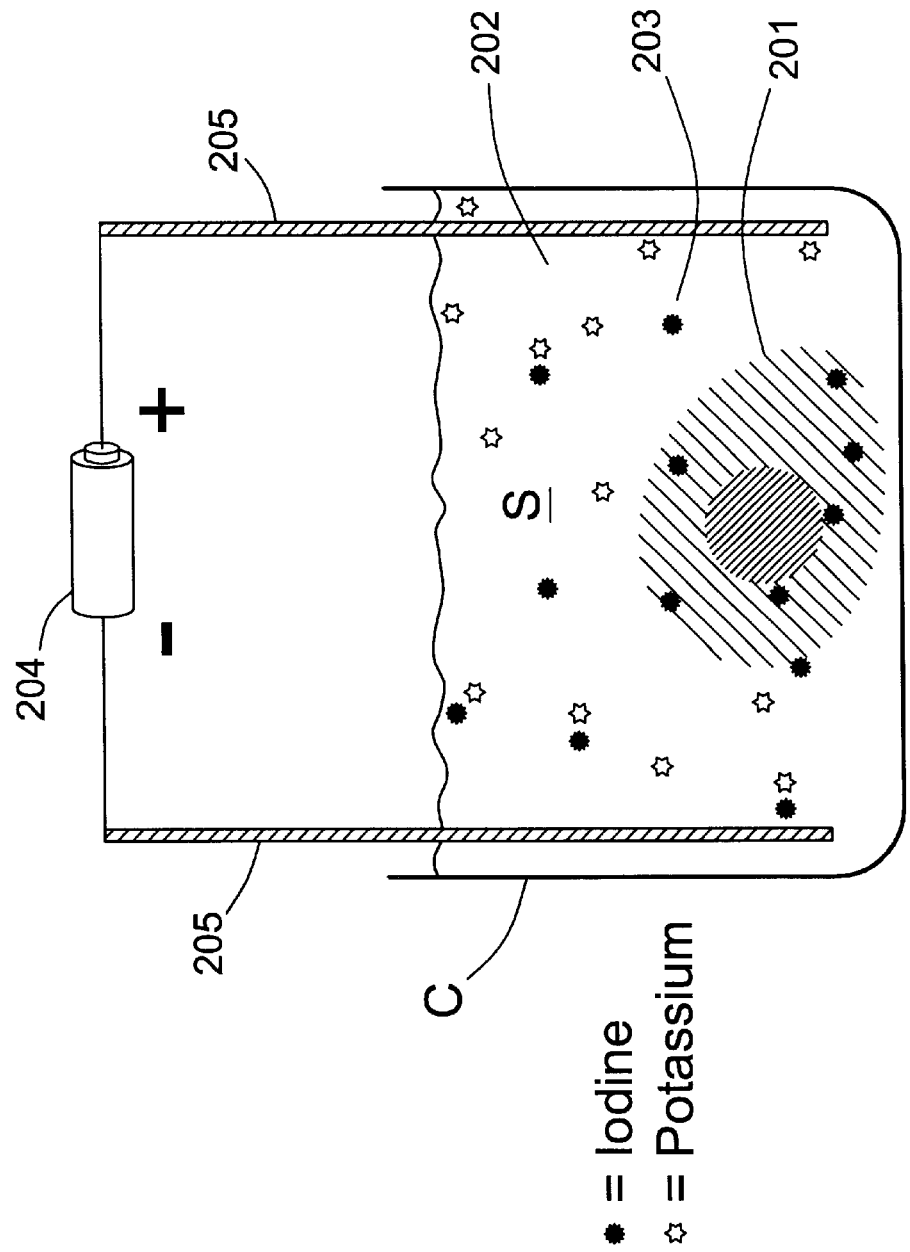

METHOD FOR THE IODINE FORTIFICATION OF EGGS

This invention relates to the fortification of eggs with iodine as a dietary supplement by contacting the eggs with a bathing solution having iodine and/or iodate ions in suspension, allowing the iodine to pass through the egg shell to the interior of the egg until an adequate internal iodine concentration of iodide or iodate salts is produced.

BACKGROUND OF THE INVENTION

It is known that iodine is a dietary requirement for humans. Failure to obtain adequate amounts of iodine (typically less than 150 micrograms per day and especially less than 50 micrograms per day) may result in endemic goiter, with accompanying mental retardation in children. Seafood is a rich source of iodine. Consequently, people in areas far from the sea are encouraged to supplement their diet with about 400 micrograms of iodine per day. This may be in the form of 0.002% to 0.01% iodized table salt.

Ingestion of iodine via iodized salt has the advantage of providing a roughly equal dosages of iodine to all members of a population. The prolonged heating of certain dishes, however, may reduce iodide and iodate ions to yield iodine. Iodine then may be lost by evaporation and sublimation.

In Trampel, (U.S. Pat. No. 4,928,629) a method is disclosed for inoculating soluble materials into an egg. The method involves removal of at least a portion of the egg's cuticle and then forcing the soluble materials with a pump to penetrate through the pores in the egg shell. This method involves special positive pressure pumps and does not seem suitable for use with large scale batches of eggs.

In Ishikawa and Kamimae, (U.S. Pat. Nos. 4,187,294, 4,394,376, and 4,410,541) iodine-fortified poultry eggs are made by feeding the birds with a prepared feed that contains high levels of iodine. This method has a disadvantage that it requires access to the feed, which makes this method impossible for eggs already obtained from a commercial farm.

In other parts of the world, eggs have been preserved in alkali by coating the egg with a composition comprising principally of wood ash and rice husk. After a few weeks, the white of the egg turns into black, jelly-like substance and the egg yolk also turns dark with a characteristic smell of ammonia.

In addition, eggs have been preserved by table salt (sodium chloride) since ancient times. After a few weeks of pickling in brine, the salt would penetrate across the egg shall into the egg, making the egg, especially the egg white, taste salty.

SUMMARY OF THE INVENTION

This invention relates to the method of fortifying eggs, especially avian eggs, with iodine. Eggs are dipped in a bathing composition or solution comprising iodide or iodate salts of alkali or alkali earth metals at an effective concentration for a duration of between a few seconds to a few days, in order to produce an adequate internal iodine concentration of iodide or iodate salts. The iodine fortified eggs may then be considered a dietary supplement for humans or animals.

Accordingly, it is the object of this invention to provide a method of fortifying eggs with iodine. This method provides the surprising result that the iodine is found to concentrate in the egg yolk as opposed to the albumen. This may be useful in the subsequent preparation of food where only the egg yolk is used, for example as an emulsifying agent in salad dressings.

It is also the object of this invention to provide a heat-stable vehicle for iodine oral administration. The fact that iodine is found to concentrate in the yolk makes it more difficult for iodine to leave the egg during cooking.

It is also the object of this invention to provide a method to supplement dietary intake of iodine without added sodium chloride, thus being suitable for people who, for personal, medical, or cultural reasons, prefer to be on low salt diet.

Another object of the invention is to provide methods where iodide or iodate salts of alkali or alkali earth metals may penetrate the pores of egg shells without breaking the egg shells. The eggs that have gone through this procedure will be indistinguishable by consumers from untreated eggs.

Yet another added benefit of the invention is that several types of microorganisms that exist on the egg cuticle, which are susceptible to iodide or iodate salts of alkali or alkali earth metal at the concentrations used, will be eliminated. Lowering the number and types of microorganisms on the egg cuticle should help lengthen the shelf life of the treated egg.

BRIEF DESCRIPTION OF THE DRAWINGS

FIG. 1 illustrates an egg placed in a solution containing iodine or iodate ions; and FIG. 2 illustrates an egg being fortified with iodate ions drawn to the egg by an electric field.

DETAILED DESCRIPTION OF THE INVENTION

Referring to FIG. 1, eggs are non-invasively fortified with iodine as a dietary supplement without compromising the structural integrity of the egg. The eggs E are placed in a solution S with container C comprising iodide or iodate salts of alkali or alkaline earth metals at an effective concentration for a duration of between a few seconds to a few days. Iodine then passes through the egg shell to the interior of the egg until an adequate internal iodine concentration of iodide or iodate salts is produced.

In a preferred embodiment, the pH of the solution is between 5 and 7.5. In addition, the temperature of the solution is maintained between 1 and 40 degrees Celsius, preferably between 20 and 30 degrees Celsius. The solution includes iodized table salt (containing 0.002% to 0.02% equivalent iodine) and added water.

The iodine-containing ionic species may be in a composition consisting of aqueous solution of iodide ($I^-$) or iodate ($IO_3^-$) salt of alkali or alkali earth metals, for example, potassium iodide or potassium iodate. The iodine-containing ionic species generated and passed through the egg's cuticle and shell seem to have high affinity for the albumen and even higher affinity for the phospholipids in the egg yolk.

Migration of iodine-containing ions through the cuticle, the porous shell, and the vitelline membrane may be influenced by one or more of the following factors: the concentration gradient of the iodine-containing ions, the osmotic pressure difference between different compartments, the thermodynamic activity of such ions, the pH difference between different compartments, the temperature of the egg and the surrounding composition, and other physical and chemical properties of iodine-containing ionic species.

Alternatively, iodide or iodate ions, which are both negative ionic species, may be induced to travel through the egg shell under the influence of a suitable electric field.

The iodine penetration process, whether performed by concentration gradient or by ionic movement under an electric field, is allowed to continue until adequate levels of iodine (e.g. iodate) have entered the egg.

The example below is set forth to illustrate this invention.

EXAMPLES

Fresh eggs are bathed in slightly acidic pH buffered, potassium iodate solutions. The method may take from a few seconds up to a few days depending on the concentration of iodine required to enter the eggs.

In a typical preparation, using 50% potassium iodate ($KIO_3$) in the bathing solution buffered with a phosphate buffer at pH 6.5 and room temperature, iodine was detected in egg yolk by the Hurtly's modification or von Fellenberg's procedure as follows:

| Bathing Time | Microgram iodine detected in yolk per 1 egg |
|---|---|
| 10 seconds | 53 |
| 20 seconds | 60 |
| 30 seconds | 100 |
| 5 minutes | 250 |
| 24 hours | 1,400 |

It will be observed that we fortify eggs without adding salt. Unlike the prior art technique of immersing eggs in salt, the iodine fortified eggs here are visually not distinguishable from regular eggs. This is an important marketing advantage to the use of this technique.

What is claimed is:

1. A method of non-invasively fortifying an egg which includes a yolk, albumen, and a surrounding shell, said method comprising contacting the egg shell with a solution of a solute selected from the group consisting of iodide and iodate salts of alkali metals and alkaline-earth metals and having a pH of 5.0 to 7.5, at a temperature between 20 and 30 degrees Celsius for a sufficient period of time to cause said solute to penetrate the shell and enter the egg.

2. A method according to claim 1 wherein the solute is an iodide salt.

3. A method according to claim 1 wherein the solute is an iodate salt.

4. A method according to claim 1 further comprising placing the egg and solution in an electric field to promote the penetration.

5. A method according to claim 1 further comprising placing the egg and solution in a magnetic field to promote the penetration.

6. A method of supplementing a diet with iodine, said method comprising non-invasively fortifying an egg which includes a yolk, albumin, and a surrounding shell by contacting the egg shell with a solution of a solute selected from the group consisting of iodide and iodate salts of alkali metals and alkaline-earth metals and having a pH of 5.0 to 7.5, at a temperature between 20 and 30 degrees Celsius for a sufficient period of time to cause said solute to penetrate the shell and enter the egg, and feeding at least part of said egg to an animal or human.

7. A method according to claim 6 further comprising feeding the yolk of the egg to an animal or human.

8. A method according to claim 7 further comprising cooking the egg prior to feeding.

9. A method for prolonging the storage life of an egg, said method comprising non-invasively fortifying an egg which includes a yolk, albumin, and a surrounding shell by contacting the egg shell with a solution of a solute selected from the group consisting of iodide and iodate salts of alkali metals and alkaline-earth metals and having a pH of 5.0 to 7.5, at a temperature between 20 and 30 degrees Celsius for a sufficient period of time to cause said solute to penetrate the shell and enter the egg, and storing the egg.

\* \* \* \* \*